United States Patent [19]

Ward

[11] 4,045,331

[45] Aug. 30, 1977

[54] DEMETALLIZATION AND DESULFURIZATION OF PETROLEUM FEED-STOCKS WITH MANGANESE ON ALUMINA CATALYSTS

[75] Inventor: John W. Ward, Yorba Linda, Calif.

[73] Assignee: Union Oil Company of California, Los Angeles, Calif.

[21] Appl. No.: 624,788

[22] Filed: Oct. 23, 1975

[51] Int. Cl.$^2$ .................. C10G 23/02; B01J 23/34
[52] U.S. Cl. .................. 208/213; 208/215; 208/251 H; 208/253; 252/463
[58] Field of Search ............ 208/251 R, 251 H, 253, 208/213, 215; 252/463, 471

[56] References Cited

U.S. PATENT DOCUMENTS

| | | | |
|---|---|---|---|
| 2,848,510 | 8/1958 | Myers et al. | 252/471 |
| 3,383,305 | 5/1968 | Rogers et al. | 252/471 |
| 3,388,074 | 6/1968 | Reitmeyer | 252/471 |
| 3,716,479 | 2/1973 | Weisz et al. | 208/251 H |
| 3,772,185 | 11/1973 | Chang et al. | 208/251 H |
| 3,876,523 | 4/1975 | Rosinski et al. | 208/251 H |
| 3,891,541 | 6/1975 | Oleck et al. | 208/251 H |
| 3,898,155 | 8/1975 | Wilson | 208/251 H |
| 3,977,999 | 8/1976 | Erickson | 252/463 |
| 3,983,599 | 11/1976 | Mattox | 252/463 |

OTHER PUBLICATIONS

Rovesti; William C. "Demetallization of Heavy Residual Oils" Ntis, Dept. of Commerce report EPA – 650/2-73-041.

Primary Examiner—Delbert E. Gantz
Assistant Examiner—James W. Hellwege
Attorney, Agent, or Firm—Gregory F. Wirzbicki; Lannas S. Henderson; Richard C. Hartman

[57] ABSTRACT

A novel process for the demetallization of petroleum feedstocks comprising contacting a petroleum feedstock at elevated pressures and temperatures, and preferably in the presence of hydrogen, with a catalyst comprising a manganese component composited with alumina, said catalyst having a surface area in excess of 175 m$^2$/gm and having at least 60% of its pore volume in pores having diameters between 50 and 200 A. Preferred catalysts comprise between about 2 and 15 weight-percent manganese. Removal of more than 25%, usually more than 50%, of the organometallic impurities can be achieved.

16 Claims, No Drawings

DEMETALLIZATION AND DESULFURIZATION OF PETROLEUM FEED-STOCKS WITH MANGANESE ON ALUMINA CATALYSTS

BACKGROUND OF THE INVENTION

This invention relates to the demetallization of hydrocarbon charge stocks. More particularly, it relates to the removal of metallic contaminants, especially those of nickel and vanadium, from residual oils.

Various petroleum feedstocks, such as crude petroleum oils, heavy vacuum gas oils, shale oils, oils from bituminous sands, topped crudes and atmospheric or vacuum residual fractions contain varying amounts of non-metallic and metallic impurities. The non-metallic impurities usually include nitrogen, sulfur and oxygen; the metallic impurities usually include nickel, vanadium, iron, sodium, copper, zinc and arsenic. In addition, it is known that most of the metallic contaminants are present as inorganic sulfides, oxides and water soluble constituents, while the remainder is usually in the form of relatively thermally stable organometallic complexes such as metal porphyrins and derivatives thereof. It is generally conceded by the art that for purposes of demetallization the removal of the organometallics is more difficult than that for the inorganics.

The presence of these contaminants in petroleum feedstocks presents assorted difficulties in the refining process. In most petroleum refineries today, however, the problems associated with the inorganic metallics and non-metallic impurities have largely been resolved. Catalytic hydrotreating or hydrofining operations effectively remove sulfur, nitrogen and oxygen from petroleum stocks by hydrodecomposition. Inorganic metallics, on the other hand, are generally removed at least in part, by filtration, water washing or electric desalting operations performed prior to hydrofining. But removal of the organometallics, especially those of vanadium and nickel, is especially troublesome. These components are readily adsorbed by conventional hydrofining catalysts and other catalysts used in cracking and reforming operations, resulting in rapid deactivation thereof.

A general method by which these organometallics can be at least partially removed prior to the above catalytic contacting processes is to pass the desalted feedstock (especially those with metals content in excess of 150 ppm) over adsorptive and/or catalytic materials. Many such materials are known in the art. For example, spent cobalt-molybdate hydrotreating catalysts have been used for this purpose but generally they are too badly coked to provide effective service. Bauxite has also been used for this purpose as reported in U.S. Pat. No. 2,687,985. Manganese nodules removed from the sea floor have been reported in a series of patents (see U.S. Pat. Nos. 3,772,185, 3,716,479, 3,766,054 and 3,813,331) as being effective for demetallizing petroleum feedstocks. However, the role of the manganese in these nodules is yet to be determined, inasmuch as the first of the aforementioned references indicates that the nodules performed better after some or all of the manganese had been leached out. A composite of 1% manganese on a large pore bauxite (more than 60% of pore volume in pores of greater than 200 A diameter) has also been used for demetallization (Demetallization of Heavy Residual Oils by Rovesti & Wolk, U.S. Environmental Protection Agency, Washington, D. C. 20460, EPA-650/2-73-041 published by U.S. Department of Commerce).

Regardless of the catalytic material used, it is most desirable that it meet the twin criteria of inexpensiveness and ability to demetallize sufficiently to extend the useful life of the hydrotreating or cracking catalyst, preferably to the extent that they become deactivated due to other factors, e.g., aging, coking, etc. This goal may be accomplished even if the demetallization is only between 25 and 50% complete because the life of the hydrotreating catalyst, for example, increases more than proportionally with the fraction of metals removed. It has been reported, for instance, that 50% demetallization can result in much more than a doubling of the useful life of a hydrotreating catalyst (see Oil & Gas Journal, April 28, 1975, pages 59-63).

Although the major reason for demetallizing a feedstock is to protect the hydrotreating and cracking catalysts, other reasons are also persuasive. For example, residual fuel oils containing excessive quantities of vanadium and nickel are virtually unsaleable because during combustion of the fuel oil in boilers these elements combine with sulfur to form corrosive compounds which rapidly destroy boiler tubing. Likewise, the coke produced from coking processes must have a limited amount of sulfur, vanadium and nickel if it is to be saleable. Thus, it is seen that demetallization of petroleum oils is necessary not only for refinery operations but also for the production of marketable products.

It has now been discovered that certain microporous catalysts comprising manganese on alumina are very effective for the demetallization of petroleum residual stocks. This result is considered surprising inasmuch as the prior art has generally focused on macroporous catalysts for this purpose, the general assumption being that catalysts having most of their total pore volume distributed in pores of diameters < 200 A do not permit sufficient penetration of the large metal-containing organic molecules into the catalyst, and thus are limited in their ability to retain vanadium and other metals. Additionally, it has also been found that the demetallization process of this invention can be conducted in an inert, pressurized environment as well as in the presence of pressurized hydrogen, although better results are obtained with the use of hydrogen.

SUMMARY OF THE INVENTION

The present invention provides a novel process for the demetallization of a hydrocarbon charge stock, especially residua and the like, by contacting the charge stock at elevated temperatures and pressures, and preferably in the presence of hydrogen, with a catalyst comprising manganese, manganese sulfide, manganese oxide or combinations thereof on alumina, said catalyst having a surface area in excess of 175 m$^2$/gm and also having at least about 60% of its total pore volume in pores having diameters between about 50 and 200 A. Preferably, no more than 30 percent of the total pore volume is distributed in pores having diameters greater than about 200 A and no more than 10% of its total pore volume is in pores having diameters less than about 50 A. The preferred catalysts comprise between 2 and 15 weight percent manganese, and have surface areas in excess of 250 m$^2$/gm if calcined at between about 800°-1600° F or in excess of 200 m$^2$/gm if calcined between 1150° and 1250° F. When used under typical hydrotreating conditions, these catalysts can generally remove more than 25%, usually more than 50%, of the organometallic constituents contained in the feedstock, even when the feedstock contains as little as 50 to 100 ppm of said organometallic constituents.

DETAILED DESCRIPTION OF THE INVENTION

According to the present invention, demetallization of a petroleum feedstock, especially a coking feedstock or a feedstock to be catalytically cracked or hydrotreated, is accomplished by passing said feedstock over a microporous catalyst comprising one or more components selected from the class consisting of manganese, manganese oxide and manganese sulfide, said one or more components being supported on alumina. (As used herein, the term "demetallization" means the removal, at least in part, of one or more organometallic and/or inorganic metallic components from a petroleum feedstock). The organometallic and/or inorganic metallic contaminants which can be removed include those of vanadium, nickel, iron, sodium, zinc, copper and arsenic. Sulfur can also be removed by this demetallization process, but its removal may or may not be desirable depending upon other circumstances (as will be shown hereinafter).

Feedstocks contemplated herein include broadly all liquid hydrocarbon mixtures, including whole crudes, which contain metals in total concentrations above about 50 ppm. However, since the metallic poisons which deactivate hydrotreating and cracking catalysts are generally associated with asphaltene components of the oil, the process will be more commonly applied to the higher boiling fractions in which the asphaltene components concentrate. Especially contemplated are atmospheric and vacuum distillation residues containing more than 1.0 weight percent sulfur and more than 50 ppm of nickel plus vanadium. Typical charge stocks include those having an initial boiling point somewhat below 900° F with a substantial proportion, generally at least 50%, by volume, boiling above 900° F.

Demetallization is herein carried out by contacting the feedstock at elevated temperatures and pressures with one or more of the catalysts hereinafter to be described in more detail. The process can be conducted in either hydrogen or inert atmospheres but since the process is primarily contemplated to be utilized prior to hydrotreating operations, it is preferred that the demetallization be done in the presence of hydrogen. Preferably, typical hydrotreating conditions are employed so that the process is more adaptable for use in a commercial refinery, such conditions being as follows:

| Operating Condition | Broad Range | Preferred Range |
|---|---|---|
| Temperature, ° F | 600–850 | 650–800 |
| Pressure, PSIA | 100–3000 | 500–2000 |
| Space Velocity, LHSV | 0.1–10.0 | 0.3–3.0 |
| Hydrogen Recycle Rate, scf/b | 1000–15000 | 4000–10000 |

In the preferred method of operation the hydrocarbon charge stock is passed upwardly or downwardly through a stationary bed of catalyst. Fluidized (or ebullient) beds or batch reactors can also be employed but usually these operations are uneconomical.

The microporous catalysts used herein may comprise manganese metal, manganese oxide (MnO, $MnO_2$, $MnO_3$, $Mn_2O_3$, $Mn_2O_7$ and $Mn_2O_4$), manganese sulfide (MnS and $MnS_2$) or combinations thereof supported on microporous alumina. The finished catalysts should contain between about 0.1 and 30 weight-percent of manganese, preferably between about 2 and 15 weight-percent thereof, and their surface areas should be in excess of 175 m²/gm, preferably in excess of 200 m²/gm, and more preferably still, in excess of 250 m²/gm. Additionally, the catalysts should have at least 60% of their total pore volumes distributed in pores having diameters between about 50 and 200 A (as determined by the mercury test method as described in "Instruction Manual, Model 900/910 Series, Mercury Penetration Porosimeter" of Micrometrics Instrument Corporation, Norcross, Ga., at 50,000 psia total pressure, 140° contact angle and 480 dynes/cm surface tension). Preferably, no more than 30% of the total pore volume is in pores having diameters greater than 200 A and no more than 10% of the total pore volume is in pores having diameters less than 50 A. Lastly, it is preferred that the catalyst compositions should have a total pore volume between about 0.3 and 0.8 cc/gm (as determined at 50,000 psia total pressure by the mercury test method hereinbefore identified).

There are many commercially available aluminas having the requisite pore size distribution hereinbefore set forth, and any of such may be used herein. Union Carbide's AB-70, AB-72 and AB-80 are typical. Uncalcined or pre-calcined (800°–1600° F for 1–24 hours in air) aluminas may be used. Using precalcined aluminas, however, has an advantage in that the pore size distribution of the final catalyst composite will be negligibly different from the alumina utilized in its preparation (provided the second calcination hereinafter described is at about the same, or less than, the precalcination temperature). Generally speaking, since uncalcined aluminas tend to increase slightly in total pore volume during calcination, it is preferred that only those uncalcined aluminas having at least 60% of their total pore volumes distributed in pores having diameters between about 50 and 175 A should be used for catalyst preparation purposes. This will allow the catalyst composite to increase slightly in total pore volume upon being calcined without also producing a final catalyst composition with an undesirable pore size distribution. However, under controlled conditions catalysts having the hereinbefore specified pore volume distributions can be obtained from uncalcined aluminas having 60% of their pore volume in pores having diameters ranging between 30 and 200 A.

There are several methods known in the art by which the manganese component can be composited with the alumina support. One such method, for example, contemplates impregnating alumina pellets or extrudates with an aqueous solution of a manganese salt, such as $MnCl_2$, $MN(NO_3)_2$, etc. Co-mulling methods are equally appropriate. Thus, alumina can be co-mulled with a solid manganese salt and then moistened with sufficient water to create a paste extrudable through a die. Alternatively, the alumina can be co-mulled with an aqueous solution of manganese salt until an extrudable paste is formed. By these and other such conventional methods manganese is composited with the alumina support.

The impregnation or co-mulling of manganese salts into or with alumina is followed by calcination between the temperatures of 800° and 1600°, preferably between 1100° and 1300° F, and more preferably still between 1150° and 1250° F. This treatment produces a catalyst containing manganese in one or more of the common oxides enumerated hereinbefore. Conversion of the manganese oxide to a sulfide or free metal, if desired, can be accomplished by respectively presulfiding or prereducing the catalyst. Typical conditions for presulfiding or prereducing include passing, respectively, a sulfiding or reducing gas over the calcined catalyst at a temperature between 300° and 400° F, at a space velocity between about 400 and 600 v/v/hr for about 2 hours. Hydrogen is usually used to prereduce the catalyst while a mixture of hydrogen and one or more components selected from the class consisting of gaseous sulfur compounds (especially $H_2S$) and sulfur vapor is suitable for presulfiding. Generally speaking, the relative proportion of hydrogen in the presulfiding mixture is not critical, with any proportion of hydrogen ranging between 10 and 90% by volume being adequate. It is preferred, however, that the presulfiding be done with a mixture of gases consisting of 10% by volume $H_2S$ and 90% by volume $H_2$.

If the catalyst is to be used in its sulfided form, it is preferred that it be presulfided. However, since it is contemplated that the catalyst will often be used under the hydrotreating conditions hereinbefore recited and with feedstocks containing 1.0 wt.% or more of sulfur, the catalyst can be effectively sulfided in situ during processing of such feedstocks.

The following two examples describe the preparation of catalysts useful for demetallization of petroleum feedstocks by the process of this invention. (Note: All the examples herein are illustrative only, and not limiting.)

EXAMPLE I 100 gm (dry basis) of cylindrical gamma alumina 1/16 inch diameter extrudate (precalcined at 1200° F) having 60% of its total pore volume distributed in pores having diameters between 50 and 200 A is impregnated by pore saturation with a solution of 90 gm of analytical reagent grade manganese chloride dissolved in 90 ml of deionized water. After contacting the alumina extrudate for 30 minutes, the excess solution is filtered off. The catalyst is then dried at 230° F overnight and calcined in air at 900° F for 2 hours. The catalyst so formed will contain between 11 and 13 weight-percent manganese (see Examples III, IV and VI hereinafter).

EXAMPLE II 100 gm (dry basis) of granular, uncalcined gamma alumina having 60% of its total pore volume in pores having diameters between 50 and 175 A is mulled with a solution of $Mn(NO_3)_2$. The solution is made by dissolving 202 gm of analytical reagent grade $Mn(NO_3)_2$ in deionized water and then diluting the solution formed with more deionized water until the final solution has a volume of 1000 ml. The paste so produced is extruded through a 1/16 inch die. The extrudates are then calcined at 1200° F. This catalyst will contain about 6 to 7 weight-percent manganese.

The following Examples demonstrate the utility of several of the catalysts used in the invention for demetallization of a residual feedstock. Especially noteworthy is the comparison between these catalysts and a microporous alumina used without a promoter.

EXAMPLE III

Four catalysts comprising between 11.1 and 12.6 wt.% Mn on four different samples of precalcined (at 1200° F) gamma alumina extrudates, designated A, B, C and D, were prepared as described in Example I. The resulting catalysts, designated $A_1$, $B_1$, $C_1$ and $D_1$, differed as shown in Table I only in their respective pore volumes, pore size distributions, surface areas and manganese contents. These catalysts were used to demetallize a desalted Kuwait residual oil of the following characteristics:

| | | | |
|---|---|---|---|
| Gravity °API | 16.7 | Conradson Carbon, wt. % | 8.5 |
| Sulfur, wt. % | 3.79 | Nitrogen, wt. % | 0.218 |
| ASTM Distillation, D | 1160, ° F | Metals, ppm | |
| IBP/5 | 480/597 | V | 52 |
| 10/20 | 662/740 | Ni | 14 |
| 30/40 | 806/870 | Other Metals | Nil |
| 50/60 | 942/1024 | | |
| EP/Rec, Vol. % | 1090/69.4 | Asphaltenes, wt. % | 5.6 |
| Ash, dry, wt. % | 0.012 | | |

The demetallization of this feedstock with each catalyst was conducted in an autoclave under the following conditions:

Pressure ($H_2$) — 1500 psig
Temperature — 720° F
Run Length — 5 hours
Catalyst Loading — 20 gm
Feed — 150 gm
Catalyst Presulfiding — 90% $H_2S$ — 10% $H_2$ for 3 hrs at 700° F The following results were obtained:

TABLE I

| | Catalyst Designation | | | |
|---|---|---|---|---|
| | $A_1$ | $B_1$ | $C_1$ | $D_1$ |
| Mn Content, Wt.%* | 11.5 | 12.6 | 11.8 | 11.1 |
| Surface Area, m²/gm | 221 | 189 | 186 | 206 |
| % Ni Removed | 0 | 7 | 7 | 0 |
| % V Removed | 36 | 48 | 56 | 31 |
| % Ni + V Removed | 28 | 39 | 45 | 24 |
| % S Removed | 8 | 12 | 12 | 0 |
| 10% Pore Volume in pores having diameters <, A | 78 | 115 | 120 | 82 |
| 30% Pore Volume in pores having diameters >, A | 121 | 143 | 154 | 103 |
| Total Pore Volume, cc/gm | .556 | .468 | .473 | .513 |

*After presulfiding

EXAMPLE IV

Four catalysts, $A_2$, $B_2$, $C_2$ and $D_2$ were prepared as described in Example III except that the final calcination was at 1200° F instead of 900° F. This treatment, as shown below, tends slightly to increase the total pore volumes and slightly to alter the pore size distributions of the resulting catalyst composites, but their overall characteristics are still within the herein prescribed limits for total pore volumes, pore size distributions, surface areas, etc. When these four catalyst composites were used to demetallize the feedstock of Example III under the same conditions, the following results were obtained:

TABLE II

| | Catalyst Designation | | | |
|---|---|---|---|---|
| | $A_2$ | $B_2$ | $C_2$ | $D_2$ |
| Mn Content, wt.%* | 11.5 | 12.6 | 11.8 | 11.1 |
| Surface Area, m²/gm | 239 | 189 | 193 | 206 |
| % Ni Removed | 29 | 0 | 0 | 36 |
| % V Removed | 79 | 44 | 50 | 88 |
| % Ni + V Removed | 68 | 35 | 39 | 77 |
| % S Removed | 34 | 4 | 10 | 39 |
| 10% Pore volume in pores having diameters <, A | 90 | 120 | 133 | 93 |
| 30% Pore volume in pores having diameters >, A | 131 | 159 | 163 | 108 |
| Total Pore Volume, cc/gm | .580 | .529 | .561 | .526 |

*After presulfiding

A comparison of the data generated in this Example with that of Example III indicates that the catalysts calcined at 1200° F and having a surface area in excess of 200 m²/g are the most effective for purposes of demetallization.

EXAMPLE V

To demonstrate that manganese is the basic active component of the present catalysts, samples of aluminas C and D used in the catalysts of Example III and IV were calcined at 1200° F for 2 hours and then used to demetallize the feedstock of Examples III and IV under the same operating conditions (except no presulfiding). The following results were obtained:

| Alumina | Surface Area m²/gm | Total Pore Volume, cc/gm | 10% Pores in Pores of Diam. < A | 30% Pores in Pores of Diam. > A | % Removal |||| 
|---|---|---|---|---|---|---|---|---|
| | | | | | Ni | V | S | Ni+V |
| C | 223 | 0.752 | 90 | 100 | 0 | 36 | 4 | 28 |
| D | 244 | 0.643 | 69 | 89 | 0 | 29 | 0 | 23 |

Comparing these results with those reported in Example III, and more especially Example IV, it is seen that there is a demonstrable increase in metals removal when a manganese component is added to the microporous alumina support.

EXAMPLE VI

An alumina extrudate used in the manufacture of a commercial cobalt-molybdate hydrotreating catalyst was used to produce an 11.9 wt.% Mn (calculated after presulfiding) on alumina catalyst. The alumina extrudate was of the kind described in Example I and the procedure used to prepare the catalyst was that described in Example I except that the catalyst composite was calcined at 1200° F. The catalyst so produced had a surface area of 220 m²/gm and a total pore volume of 0.619 cc/gm, of which 10% was in pores having diameters less than 63 A and 30% was in pores having diameters greater than 164 A. When it was used to treat the Kuwait oil of Examples III through V under the same conditions, the following results were obtained: 29% removal of nickel, 88% removal of vanadium, 9% removal of sulfur and 76% removal of nickel + vanadium.

EXAMPLE VII

To demonstrate the improved results obtainable by the use of catalysts having a high surface area (i.e., in excess of 250 m²/gm), two catalysts were prepared as follows:

CATALYST #1

100 gm (dry basis) of a precalcined (at 1200° F) gamma alumina extrudate having a surface area of about 320 m²/gm and having at least 60% of its total pore volume distributed in pores having diameters between 50 and 200 A was impregnated by pore saturation with a solution of 35 gm of analytical reagent grade manganese chloride dissolved in 70 ml of deionized water. After contacting the alumina for 30 minutes, the excess solution was filtered off. The catalyst was then dried at 230° F overnight and calcined in air at 900° F for 2 hours. The catalyst so formed was found after presulfiding to contain 4.0 wt.% manganese and had a surface area of 316 m²/gm and had a total pore volume of 0.52 cc/gm, of which 10% was in pores having diameters less than 60 A and 30% was in pores having diameters greater than 100 A.

CATALYST #2

The second catalyst was prepared identically as the first except that it was calcined at 1200° F. It was found after presulfiding to contain 4.0 wt.% manganese and had a surface area of 303 m²/gm and had a total pore volume of 0.477 cc/gm, of which 10% was in pores having diameters less than 79 A and 30% was in pores having diameters greater than 96 A.

When these two catalysts were used to demetallize the feedstock of Examples III through VI under the conditions specified in Example III, the following results were obtained:

| Catalyst | % Removal ||||
|---|---|---|---|---|
| | Ni | V | S | Ni and V |
| #1 | 36 | 83 | 56 | 73 |
| #2 | 50 | 85 | 56 | 77 |

From the foregoing, it would appear that increasing the surface area of the catalyst tends to overcome the deleterious effects of low temperature calcination.

While all but one of the catalysts used in the demetallization process of the invention (as shown in Examples III, IV, VI and VII) gave at least partial desulfurization of the feedstock, some have shown little desulfurization activity while others have demonstrated a great deal. For example, when the data obtained from the catalyst of Example VI are compared with those of the two catalysts in Example VII, a great disparity in results is seen. Actually, this makes the demetallization process herein more utilitarian. In those situations wherein some desulfurization is desired (e.g., to take some load off the hydrotreating catalyst), one would use those demetallization catalysts which are effective for that purpose. However, where maximum life of the demetallization catalyst is a primary requirement, it will in most cases be desirable to select a catalyst having relatively little desulfurization activity, since the desulfurization reactions tend to accelerate coking of the catalyst.

In order to show that demetallization can be carried out in an inert atmosphere, the following Example is provided.

EXAMPLE VIII 200 gm of a gamma alumina extrudate of the kind described in Example VII was impregnated by pore saturation with a solution of 180 gm of analytical reagent grade MnCl₂ dissolved in 180 cc of deionized water. After contacting the alumina for 30 minutes, the excess solution was filtered off. The catalyst was then dried at 230° F overnight and calcined in air at 1200° F for 2 hours. After presulfiding under the conditions specified in Example III the catalyst was found to contain 10.4 wt.% Mn, had a surface area of 264 m²/gm and a total pore volume of 0.48 cc/gm, of which 10% was in pores having diameters less than 74 A and 30% was in pores having diameters greater than 96 A.

When this catalyst was used to demetallize the feedstock used in Examples III through VII, inclusive, under the conditions specified in Example III, the following results were obtained: 36% removal of Ni, 79% removal of V, 50% removal of S and 70% removal of Ni + V. Under the same operating conditions as Example III except that a nitrogen atmosphere was substituted for the hydrogen atmosphere, the following results were obtained: 0% removal of Ni, 23% removal of V, 5% removal of S and 18% removal of Ni + V.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

I claim:

1. In a process for the demetallization and desulfurization of a liquid hydrocarbon feedstock wherein said feedstock is contacted with a demetallization and desulfurization catalyst at a hydrogen partial pressure between about 100 and 3000 psia and at a temperature between about 600° and 850° F and at a space velocity between about 0.1 and 10.0 L.H.S.V. to obtain therefrom a substantially demetallized product oil, the improvement which comprises utilizing as said demetallization catalyst a composition comprising one or more active manganese components composited with alumina, said catalyst composition having at least 60% of its total pore volume distributed in pores having diameters between about 50 and 200 A, having a surface area in excess of 250 m²/gm, and containing between about 0.1 and 30 wt.% (calculated as manganese) of said one or more manganese components.

2. A process as defined in claim 1 wherein said one or more manganese components are selected from the class consisting of manganese metal, manganese oxides, and manganese sulfides.

3. A process as defined in claim 1 wherein said catalyst has a total pore volume between about 0.3 and 0.8 cc/gm.

4. A process as defined in claim 3 wherein no more than 30% of said total pore volume is distributed in pores having diameters greater than 200 A and no more than 10% in pores having diameters less than 50 A.

5. A process as defined in claim 1 wherein no more than 30% of said total pore volume is distributed in pores having diameters greater than 200 A and no more than 10% in pores having diameters less than 50 A.

6. A process as defined in claim 5 wherein said catalyst has a total pore volume between about 0.3 and 0.8 cc/gm.

7. A process as defined in claim 6 wherein at least 60% of the total pore volume of said catalyst is distributed in pores having diameters between about 60 and 100 A.

8. A process as defined in claim 1 wherein said catalyst has been calcined at a temperature between about 1100° and 1300° F.

9. A process as defined in claim 1 wherein said catalyst comprises between about 2 and 15 weight percent of said one or more manganese components (calculated as manganese).

10. A process as defined in claim 1 wherein at least 60% of the total pore volume of said catalyst is distributed in pores having diameters between about 60 and 100 A.

11. A catalyst composition consisting essentially of between about 0.1 and 30 wt.% (calculated as manganese) of one or more active manganese components selected from the class consisting of manganese metal and the oxides and sulfides thereof, supported on alumina, said catalyst composition having at least 60% of its total pore volume in pores having diameters between 50 and 200 A and having a surface area in excess of 250 m²/gm.

12. The catalyst composition of claim 11 wherein said catalyst has a total pore volume between about 0.3 and 0.8 cc/gm.

13. A catalyst as defined in claim 12 wherein no more than 30% of said total pore volume is distributed in pores having diameters greater than 200 A and no more than 10% in pores having diameters less than 50 A.

14. A catalyst composition as defined in claim 13 wherein at least 60% of the total pore volume of said catalyst is distributed in pores having diameters between about 60 and 100 A.

15. A catalyst as defined in claim 11 having no more than 30% of said total pore volume distributed in pores having diameters greater than 200 A and no more than 10% in pores having diameters less than 50 A.

16. A catalyst composition as defined in claim 11 wherein at least 60% of the total pore volume of said catalyst is distributed in pores having diameters between about 60 and 100 A.

* * * * *